Feb. 21, 1967   R. E. HOPKINS   3,304,812
METHOD OF MANUFACTURING BLADES
Filed Sept. 23, 1964
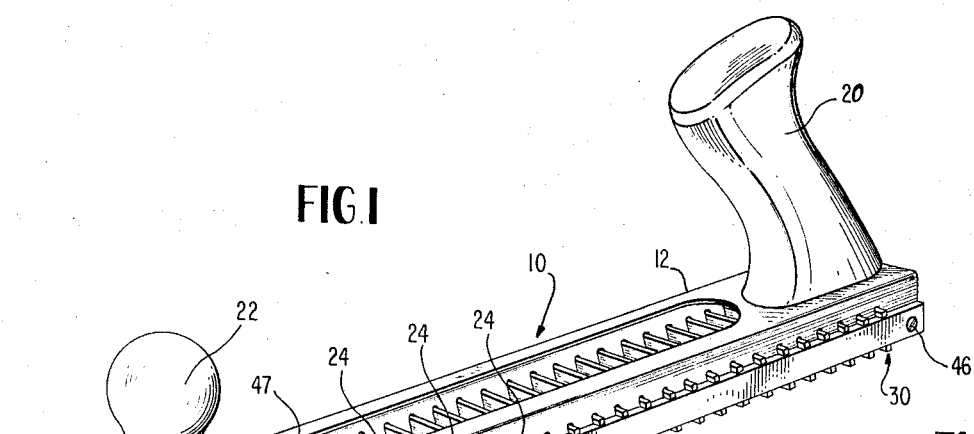
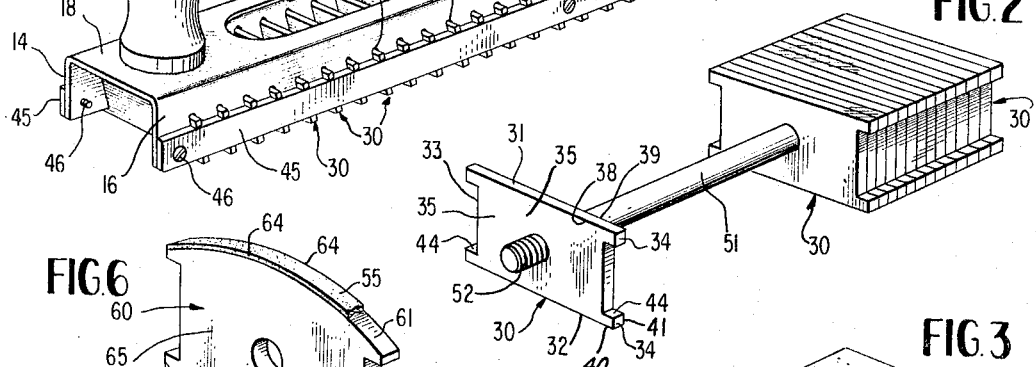
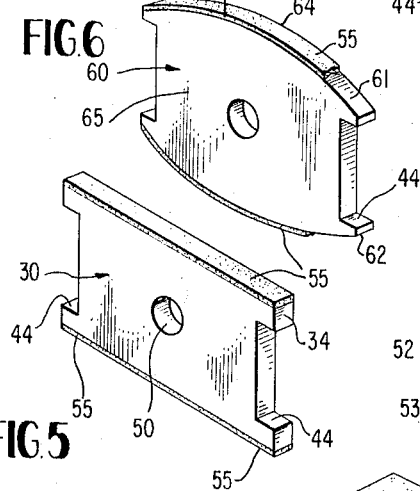
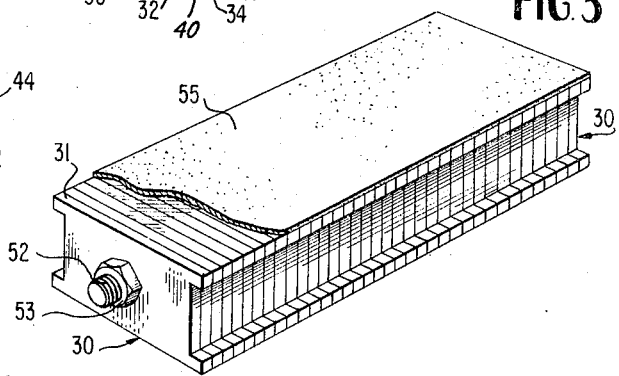
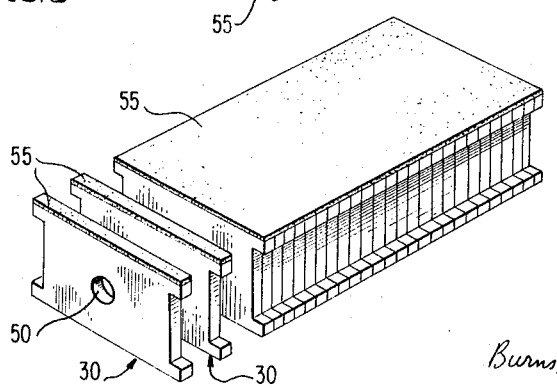
INVENTOR.
ROSS E. HOPKINS
BY
Burns, Doane, Benedict, Swecker & Mathis
ATTORNEYS

United States Patent Office 3,304,812
Patented Feb. 21, 1967

3,304,812
METHOD OF MANUFACTURING BLADES
Ross E. Hopkins, 428 Peyton, Emporia, Kans. 66801
Filed Sept. 23, 1964, Ser. No. 398,712
8 Claims. (Cl. 76—101)

This invention relates to blades for hand tools, more particularly to blades having four separate working edges, and to a method of manufacturing these blades. The hand tool is of the type used to scrape, shape or file various materials such as plastic, wood, lead, and the like, shown for example in copending application Serial No. 369,105, filed May 21, 1964.

The hand tool with which the blades of this invention are used has an elongated U-shaped frame member normally positioned so that the flanges or sides depend downwardly from the web to which is attached a forward and a rear hand grip. A series of slots extend from the lower edges of the sides upwardly toward the web. These slots are disposed at a slight angle directed toward the front of the tool. The several slots in one side are parallel to one another and the slots in both sides of the frame member are aligned transversely of the frame member in pairs. Each pair of slots is adapted to receive one of the blades of this invention.

When the hand tool is equipped with a full complement of blades, the working edges of the several blades together provide a series of parallel edges, each of which extends transversely of the frame; and when the tool is pushed across a surface, the series of edges apply what might be described as a combined scraping and filing action.

Generally speaking, each blade is rectangular in configuration with long sides and short sides disposed about front and rear faces, the short sides being notched for receiving means for holding the blade in the hand tool frame. Each blade is made of a relatively thick material. The two long sides of each blade have flat surfaces along which extend the working edges. Each blade has four of these working edges, the blades in cross section being substantially rectangular, with each corner of the rectangle, in effect, providing a working edge. Only one of these working edges at a time on a single blade is exposed to the surface to be worked. The flat surface of each long side of each blade has a hard-facing of a wear-resistant alloy.

Each blade is manufactured by first stamping or machining or by otherwise forming the main part of the blade itself. Each blade is provided with a hole through the opposite faces so that several blades can be strung on a rod and stacked with the long sides aligned forming opposed large, flat surfaces. The several blades are fastened together on the rod by a bolt. The flat surfaces formed by the aligned long sides of the several blades are worked to sharpen the working edges as by subjecting the surfaces to a surface grinder. While the several blades are fixed on the rod and with the long sides aligned, a hard-facing material is sprayed over the several long sides.

After the hard-facing material has been applied to one side only of each blade, the bolt is loosened and each blade is separated one from the other by breaking the hard-facing material which joins the several blades together. After the blades have been separated, they are bolted together again on the rod and the other flat surfaces of the long sides are sprayed with the hard-facing material. After this, the bolt is loosened and the several blades are separated once again.

In one embodiment, all four of the working edges of each blade are in a straight line and parallel, the general configuration of the blades being rectangular. In another embodiment, the four working edges of each blade are curved, the general configuration of the blade being a truncated oval.

The blade of this invention and the embodiments thereof, and certain steps of the method relating to the manufacture thereof, are illustrated in the drawings in which:

FIGURE 1 is a perspective view of a hand tool holding several blades of this invention;

FIGURES 2, 3 and 4 represent certain steps in the manufacture of the blades; and FIGURES 5 and 6 show two blade modifications.

The hand tool 10 with which the blades of this invention are used is illustrated in FIGURE 1 and includes a frame 12 in the shape of a channel member with the opposite flanges or sides 14 and 16 depending downwardly from the web 18. A rear hand grip 20 is secured to the rear of the frame 12 and a front hand grip 22 is secured to the front of the frame. The frame 12 with the rear hand grip 20 and the forward hand grip 22 has some resemblance to an ordinary wood plane.

Each of the sides 14 and 16 of the frame member 12 has provided therein a series of slots 24 opened to the bottom or free edge of the sides and extending upwardly toward the web 18. Each slot 24 extends slightly forward in a straight line from the point where it enters the side. The several slots 24 on each side are arranged in parallel fashion along the length of the frame 12. Corresponding slots in the two sides 14 and 16 are aligned directly transversely of the frame to provide pairs of slots. In the embodiment illustrated in the drawings, there are thirty pairs of slots. While this number may be varied somewhat, the invention contemplates a relatively large number of such slots.

Each pair of slots in the sides 14 and 16 cooperates to receive a single blade 30. The respective proportions and dimensions of each blade compared with the frame 12 is illustrated in FIGURE 1, although certain dimensions may be varied somewhat. It is important that the relative thickness of each blade be maintained. The blades 30 are generally rectangular in configuration, having top and bottom elongated sides 31 and 32, and shorter opposed sides 33 and 34, extending about opposed faces 35. The top elongated side 31 and the bottom elongated side 32 are substantially parallel, each providing two straight line working edges along opposite sides of the flat surfaces. These separate working edges are designated by reference numerals 38 and 39 in connection with the side 31 and numerals 40 and 41 in connection with the side 32.

Each blade 30 is adapted to be received within one of the pairs of slots 24, and each blade 30 has a notch 44 in each short side 33 and 34, which sides extend transversely beyond the sides 14 and 16 when the blade 30 is positioned in the slots. The several blades 30 are held in position with respect to the frame 12 by a pair of bars 45 which extend lengthwise of the frame 12 adjacent the lower edge of the sides 14 and 16. The bars 45 fit snugly within notches 44 of the blades 30 and are held securely to the sides 14 and 16 by threaded connectors 46.

The relationship of the several parts when assembled is illustrated in FIGURE 1. Each blade 30 slopes slightly toward the front of the hand tool 10 at an angle of approximately five degrees with the vertical. This angle may be varied somewhat; nevertheless, the blades should extend obliquely with respect to the longitudinal axis of the frame 12. That is, the top of each blade 30 is slightly forward of the rear of the blade. Each blade 30 extends slightly below the lower edge of the sides 14 and 16 of the frame 12. Only one of the four working edges 38–41 of each blade 30 is in position for engagement with the surface to be worked. The three remaining working edges of each blade 30 remain out of working position and are not exposed to the surface to be worked.

The width of the slots 24 in the sides 14 and 16 of the frame 12 should be proportioned with respect to the width or thickness of the blades 30 so that there is minimum clearance. That is, the blades 30 should fit snugly within the slots 24. This allows the blades 30 to be removed from the frame 12 for reversing or for sharpening, but at the same time serves to prevent chattering or vibration of the blades with respect to the frame 12. It has been found that the working edges, that is the exposed edges of the blades, may extend approximately .10 inch below the extreme bottom edge of the sides 14 and 16 of the frame 12 when inserted in the slots 24 for satisfactory results. The inside, longitudinal dimension of the notches 44 of the blades should be proportioned with respect to the width of the bars 45 so that the inside surfaces of the notches 44 snugly engage the bars 45. The slots 24 should be long enough so that the top edges of the blades do not engage the inside surface of the slots. These relative dimensions provide for the holding of each blade rigidly with respect to the frame 12 and yet prevent the bearing of the top of the blades against the inside of the slots thereby protecting the top working edges of the blade.

The hand tool 10 is used to form, scrape or shape the surface to be worked in a motion similar to that employed with an ordinary wood plane. The rear hand grip 20 is grasped in one hand and the forward hand grip 22 is grasped in the other, and the device is pushed forward so that the one exposed working edge of each blade 30 is pushed firmly over the surface. By careful manipulation, the user can scrape or remove from the surface only the desired amount of material. The web 18 of the frame 12 has a relatively large opening 47 therein so that removed material will not be trapped in the space between the top of the blade 30 and the bottom surface of the web 18 as the material slides upwardly along the front face of the blades 30.

After the tool 10 has been used for a considerable period and the exposed working edges become dull, the several blades 30 can be removed and re-inserted so that a different working edge is exposed to the surface to be worked. This repositioning of the blades is done simply by removing the threaded fasteners 46, dislodging the bars 45 from the notches 44, removing the blades from the slots, and then positioning each blade 30 as desired. The blades 30 may be reversed top-to-bottom or front-to-back so that any one of the four working edges may be placed in the exposed position, one at a time.

Each blade 30 may be stamped, machined or otherwise made out of metal stock, cold rolled steel for example. Preferably, each blade should be approximately one-tenth of an inch thick, although this dimension may be varied. The notches 44 are made in the short sides 33 and 34 of suitable dimensions to receive the arm 45. Each blade 30 is provided with a hole 50 through the front and rear faces 35 so that several blades at one time may be strung on a rod 51. The blades are slid over the rod 51 and then squarely aligned as shown in FIGURE 2. Several blades, perhaps thirty or forty, can be stacked at one time on the rod. The number of blades to be worked on may vary, but the process can most efficiently handle a large number of blades. One end of the rod 51 has an enlarged head thereon and the other end is threaded at 52 to receive a nut 53. The nut is to be tightened to hold the several blades 30 firmly aligned in an assembled unit shown in FIGURE 3. The flat surfaces 31 and 32 of the several blades are then ground smooth on a surface grinder for example. In addition, the flat surfaces 31 and 32 may be grit blasted if desired. This provides the sharp, keen edges 38–41 between the flat surfaces 31–32 and the faces 35.

Next, a hard-facing material 55 is applied to the several flat surfaces 31 only of the several assembled blades.

The hard-facing material preferably is applied by spraying a thin coating thereof to a depth of between .008 in. to .015 in. Equipment for spraying the hard-facing material is available commercially as is the spray material which may be a nickel-base, cobalt-base or tungsten carbide powder or other suitable substance capable of resisting abrasion after being deposited.

Once the hard-facing material 55 has been applied to the flat surfaces 31 only, the nut 53 is removed or loosened. The several blades 30 are held together by the hard-facing material. Each blade 30 is then separated from the other one at a time by forcefully pulling or tapping the blades apart. This breaks or shears the hard-facing material 55 at the working edges 38 and 39 of each blade. Each flat surface 31 throughout the extent of the working edges 38 and 39 is covered with the hard-facing material 55. Although the hard-facing material does not extend over the faces 35, it does protrude sufficiently far enough toward the surface to be workd when the blades are assembled in the frame 12 to provide sharp, keen, wear-resistant working edges 38 and 39.

The several blades 30 are assembled and aligned again on the rod 51 and held by the nut 53. The other group of flat surfaces 32 of the several blades is sprayed with a coating of hard-facing material 55 in the same manner as the surfaces 31. After this has been completed, each blade 30 is separated from the other one at a time by forcefully pulling or tapping the blades apart after the nut 53 has been removed from the rod 51.

The several blades 30 are sprayed first along on flat surface only in order to make it relatively easy to break the blades apart, although it is entirely possible that both sides could be sprayed before the blades are separated. During the spraying operation, the coating of hard-facing material is applied as evenly as possible over the surfaces 31 and 32 of all of the assembled blades. The resulting hard surface of wear resistant material makes an extremely sharp edge at 38, 39, 40 and 41 of each blade 30.

The blades 30 illustrated in FIGURES 1 through 5, are generally rectangular in configuration with the flat surfaces 31 and 32 being planar and parallel. In the modified form illustrated in FIGURE 6, the blade 60 has opposite surfaces 61 and 62 of convex or curved configuration so that the blade 60 has the appearance of a truncated oval. The surfaces 61 and 62 correspond with the surfaces 31 and 32 of the blades 30, and similarly present four distinct sharp working edges 64 at the juncture with the opposed faces 65. Each blade 60 is provided with notches 44 in the sides thereof which notches correspond with the similarly numbered notches 44 in the blades 30 whereupon the bars 45 may be received therein to hold the blades 60 in position on the frame 12. These blades 60 with the convex or curved surfaces 61 and 62 are used generally in the same manner as the blades 30 except that the curved working edges 64 present a different type of engagement with the surfaces to be worked, and for this reason have somewhat different utility. The two types of blades, that is the blades 30 with the straight working edges and the blades 60 with the curved working edges, together provide considerable utility and versatility with respect to the type of scraping that may be done. A combination scraping and filing action is created when the tool is forced firmly over the surface. The several working edges enhance the efficiency considerably and the two different types of blades, that is the straight-edge blade and the curved-edge blade, can be used alternatively with a single frame member. The slight angling of the blades together with the relative proportions of the blades, as described, provide four distinct working edges on each blade, and the several blades can be removed easily from the frame for switching to expose a new working edge or for sharpening as necessary. The method of manufacture is considerably efficient and allows for the hard-facing of several blades at one time by means of a spray operation.

Also, the method most efficiently results in four hard-faced working edges on a single blade.

While certain representative embodiments and details have been shown for the purpose of illustrating the invention, it will be apparent that various changes and modifications may be made without departing from the spirit or scope of the invention.

I claim:

1. A method of applying a wear-resistant surface to a group of blades for a hand tool, each blade having front and rear faces with a hole therethrough and an elongated side having a continuous, even surface, the junctures between said faces and said surface forming the working edges of the blade; said method comprising the steps of placing the group of blades on a rod so that the rod passes through the holes in the several blades; aligning the surfaces of the several elongated sides; holding the group of blades together in tight face-to-face relationship; depositing a coating of a wear-resistant material evenly over the several surfaces of the elongated sides while the blades are on the rod; and then separating the blades from one another thereby breaking the wear-resistant material along the working edges of the blades but leaving the wear-resistant material extending over the surfaces and along the working edges.

2. A method of applying a wear-resistant surface to a group of blades for a hand tool, each blade having front and rear faces with a hole therethrough; elongated sides each having a continuous, even surface, the juncture between said faces and surfaces forming the working edges on each blade; said method comprising the steps of placing the group of blades on a rod so that the rod passes through the holes in the several blades; aligning the surfaces of the several elongated sides so that the working edges are together, the resulting assembly having opposed surface areas; holding the group of blades together in tight face-to-face relationship; depositing a wear-resistant material evenly over only one of the opposed surface areas of the assembled blades; separating the blade; re-aligning the surfaces of the several elongated sides; holding the group of blades together again in tight face-to-face relationship; depositing a wear-resistant material evenly over the remaining opposed surface area of the assembled blades; and then again separating the blades.

3. The method of applying a wear-resistant surface to a group of blades as defined in claim 2 wherein the depositing of a wear-resistant material is effected by spraying.

4. The method of applying a wear-resistant surface to a group of blades as defined in claim 2 wherein the wear-resistant material is deposited to a depth of between .008 inch and .015 inch.

5. A method of manufacturing a group of blades for a hand tool comprising the steps of forming each blade with front and rear faces with a hole therethrough, and opposed elongated sides each having a continuous, even surface, the juncture between said faces and surfaces forming the working edges of the blade; placing each blade of the group on a rod so that the rod passes through the holes in the blades; aligning the surfaces of the elongated sides so that the working edges of adjacent blades are together; holding the blades together in tight face-to-face relationship; depositing a coating of wear-resistant material evenly over the surfaces of the elongated sides while the blades are on the rod; and then forcing the blades apart thereby breaking the wear-resistant material along the working edges of the blades but leaving the wear-resistant material extending over the surfaces and along the working edge of each blade.

6. The method of manufacturing a group of blades as defined in claim 5 wherein the holding of the blades is achieved by using a rod having a head on one end larger than the holes in the blades and threading a nut on the other end against the last blade placed on the rod.

7. The method of manufacturing a group of blades as defined in claim 5 wherein the depositing of a coating of wear-resistant material is effected by spraying.

8. A method of applying a wear-resistant surface to a group of blades for a hand tool, each of said blades having front and rear faces and an elongated side having a continuous even surface, the junctures between said surface and said faces forming working edges, said method comprising the steps of holding said blades together in tight face-to-face relationship with said surfaces in alignment, then depositing a continuous coating of a wear-resistant material on said surfaces, and then separating said blades from one another after said material has hardened thereby breaking said wear-resistant material along said working edges but leaving said material extending over said surfaces and along said edges.

References Cited by the Examiner

UNITED STATES PATENTS

| | | | |
|---|---|---|---|
| 991,566 | 5/1911 | Vernaz | 29—79 |
| 1,035,736 | 8/1912 | Puppe | 29—79 |
| 1,645,895 | 10/1927 | Coenen | 76—24 |
| 2,993,390 | 7/1961 | Fouquet | 76—24 |
| 3,122,958 | 3/1964 | Washburn | 76—101 X |

GRANVILLE Y. CUSTER, Jr., *Primary Examiner.*